United States Patent
McKellar et al.

(10) Patent No.: US 10,525,780 B2
(45) Date of Patent: Jan. 7, 2020

(54) APPARATUS AND METHOD FOR DETECTING VEHICLE MOTION IN A TIRE PRESSURE MONITORING SYSTEM

(71) Applicant: Schrader Electronics Limited, Antrim (GB)

(72) Inventors: Robert McKellar, Antrim (GB); Samuel Strahan, Broughshane (GB); John Wilson, Antrim (GB)

(73) Assignee: SCHRADER ELECTRONICS LIMITED, Antrim (GB)

( * ) Notice: Subject to any disclaimer, the term of this patent is extended or adjusted under 35 U.S.C. 154(b) by 202 days.

(21) Appl. No.: 15/388,762

(22) Filed: Dec. 22, 2016

(65) Prior Publication Data

US 2017/0174015 A1    Jun. 22, 2017

(30) Foreign Application Priority Data

Dec. 22, 2015   (GB) .................. 1522596.4

(51) Int. Cl.
*B60C 23/04* (2006.01)
*G01H 13/00* (2006.01)

(52) U.S. Cl.
CPC ......... *B60C 23/0488* (2013.01); *G01H 13/00* (2013.01)

(58) Field of Classification Search
CPC .. G01M 17/02; G01M 17/021; G01M 17/022; G01M 17/027; G01M 17/025; G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/04; G01M 3/40; G01M 5/0091; G01M 7/02; G01M 99/00; G01M 99/002; B60C 23/0494; B60C 23/04; B60C 23/0493; B60C 2019/004; B60C 19/00; B60C 23/0498; B60C 23/064; B60C 23/0488; B60C 23/0496; B60C 23/0408; B60C 23/041; B60C 23/0411; B60C 23/20; B60C 11/243; B60C 11/246; B60C 23/06; B60C 23/061; B60C 23/00;

(Continued)

(56) References Cited

U.S. PATENT DOCUMENTS

2004/0267493 A1   12/2004  Pinard et al.
2005/0081615 A1*   4/2005  Stewart ............... B60C 23/0408
                                                         73/146

(Continued)

FOREIGN PATENT DOCUMENTS

JP    2010160064 A    7/2010

OTHER PUBLICATIONS

GB Search Report for Application No. GB1522596.4 from the GB Intellectual Property Office dated Jun. 23, 2016.

*Primary Examiner* — Andre J Allen
(74) *Attorney, Agent, or Firm* — Holland & Hart, LLP

(57) ABSTRACT

A tire pressure monitoring device for a wheeled vehicle that is capable of detecting vehicle motion from the output of a pressure sensor. The device determines from the output signal an indication of the power of the signal, for example the variance of the signal, and detects if the vehicle is stationary or in motion depending on the determined indication of power. The device may determine that the vehicle is in motion if the determined indication of power exceeds a threshold value.

22 Claims, 4 Drawing Sheets

(58) Field of Classification Search
CPC ............. B60C 23/0486; B60C 11/0083; B60C 13/003; B60C 2009/2038; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/00; B60C 99/006; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2006/0259214 A1* | 11/2006 | McQuade | B60C 23/0413 340/445 |
| 2007/0125161 A1* | 6/2007 | Bryzek | B60C 23/0408 73/146.4 |
| 2007/0156320 A1* | 7/2007 | Breed | B60C 23/0408 701/70 |
| 2009/0224899 A1 | 9/2009 | Wieser | |
| 2010/0066522 A1 | 3/2010 | Ichikawa et al. | |
| 2010/0131231 A1 | 5/2010 | Rushgrove | |
| 2016/0176245 A1* | 6/2016 | McIntyre | B60C 23/04 340/442 |
| 2017/0015151 A1* | 1/2017 | Bill | B60C 23/0479 |
| 2017/0174193 A1* | 6/2017 | Kirkpatrick | B60C 23/0408 |

* cited by examiner

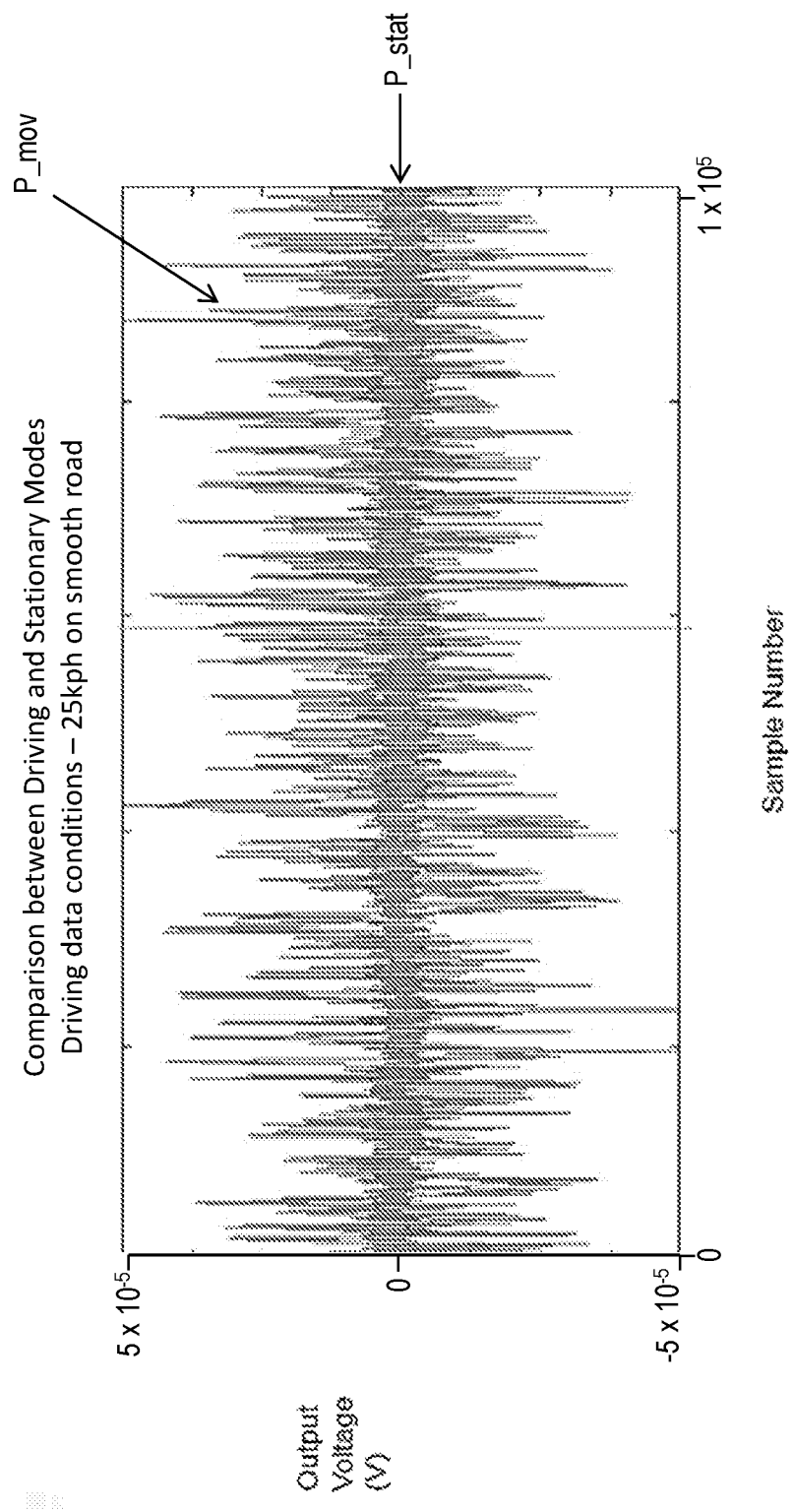

APPARATUS AND METHOD FOR DETECTING VEHICLE MOTION IN A TIRE PRESSURE MONITORING SYSTEM

FIELD OF THE INVENTION

The present invention relates to detecting motion of a vehicle that includes a Tire Pressure Monitoring System (TPMS).

BACKGROUND TO THE INVENTION

Conventionally, the wheel mountable units of a tire pressure monitoring system (TPMS) include a motion sensing device for detecting when the wheel on which they are mounted is rolling, and thus when the vehicle is moving. The TPMS may therefore adopt a "sleep" mode to conserve battery energy when the vehicle is stationary. Typically the motion sensing devices are either accelerometers or shock sensors. Shock sensors have the disadvantage that they are large and occupy a significant portion of the limited space available on wheel unit, typically on its printed circuit board (PCB). They also require an interface circuit that has a high input impedance. The interface circuit is sensitive to any contaminates on the PCB such as flux residue and moisture. These issues can lead to false detection of motion when the vehicle is not moving; this problem is sometimes known as constant wake. Eliminating the shock sensor would remove these problems and also reduce cost.

Accelerometers are generally packaged with at least a signal conditioning circuit and/or an ASIC or data processing integrated circuit, and are typically micro-machined using established MEMS processes. Accelerometers have the disadvantages of requiring calibration and being expensive.

It would be desirable therefore to provide alternative means for detecting wheel rotation and therefore vehicle motion.

SUMMARY OF THE INVENTION

A first aspect of the invention provides a tire pressure monitoring device for a wheeled vehicle, the device comprising:

a pressure sensor for measuring fluid pressure in a tire of said vehicle and generating an output signal indicative of said fluid pressure;

means for determining from said output signal an indication of the power of said output signal; and means for detecting if said vehicle is stationary or in motion depending on said determined indication of power.

Said detecting means may be configured to determine that said vehicle is in motion if said determined indication of power exceeds a threshold value.

Said detecting means may be configured to determine if said vehicle is in motion if said determined indication of power indicates that said power has changed by more than a threshold amount.

Preferably, said indication of power comprises a measure of the variance of the output signal.

Conveniently, said determining means is configured to determine said indication of power in respect of the entire frequency spectrum of said output signal. Optionally, said determining means is configured to determine said indication of power in respect of at least one frequency band corresponding to part of the frequency spectrum of said output signal. For example said at least one frequency band comprises any one or more of the following frequency bands: 0 to 500 Hz; 0 to 300 Hz; 0 to 100 Hz; 200-300 Hz.

Typically, said determining means includes means for measuring a characteristic, for example magnitude, of said output signal from which said power indication can be calculated.

In some embodiments said output signal comprises first and second complementary differential signals, said characteristic being the difference between said first and second differential signals.

Said measuring means may be configured to sample said output signal and to measure said characteristic in respect of each signal sample. Preferably said determining means is configured to determine said power indication from the respective measured characteristic of a plurality of said signal samples. Said plurality of signal samples may be taken in respect of an assessment period, said determining means being configured to determine said power indication for said assessment period. The device may be configured to implement multiple instances of said assessment period, preferably periodically. Said motion detection means may be configured to determine if said vehicle is in motion in respect of the, or each, assessment period.

In preferred embodiments at least said measuring means is implemented by a measurement apparatus comprising circuitry for measuring said output signal. Said measurement apparatus may include a sampling circuit for sampling said pressure sensor output signal, and wherein, preferably, the pressure sensor is configured to produce an output signal comprising first and second complementary differential signals, said sampling circuit being configured to sample both of said differential signals. Optionally said measurement apparatus includes a measuring circuit for measuring said characteristic in respect of each sample, preferably from a respective corresponding sample value for each of said differential signals.

In preferred embodiments said measurement apparatus includes means for storing the or each signal sample value obtained by said sampling circuit. The pressure sensor may be configured to produce an output signal comprising first and second complementary differential signals, and wherein said measurement apparatus includes: a sampling circuit for sampling both of said differential signals of said pressure sensor output signal; means for storing the respective sample values; and a measuring circuit for measuring said characteristic in respect of each sample from the respective corresponding sample value for each of said differential signals.

In preferred embodiments said storage means comprises at least one respective capacitor for the or each signal sample value.

The measuring circuit may be configured to measure the difference between the respective corresponding sample value for each of said differential signals. The respective corresponding sample value for each of said differential signals may be stored by a respective storage device and said measuring circuitry is configured to discharge one of the sample values from the respective storage device, said measuring circuitry including or being co-operable with, means for determining a time taken for said discharged sample value to match said other sample value, and wherein said time preferably provides a measure of said characteristic. The respective storage device preferably comprises at least one respective capacitor.

In preferred embodiments said one sample value is discharged, in use, to a first comparator input, while the other sample value is present at a second comparator input, the comparator providing an output indicating when the discharged sample value matches the other sample value.

Typically the device includes a controller, said controller being configured to implement said motion detecting means.

The device may include a controller configured to implement said determining means other than said measuring means.

A second aspect of the invention provides a tire pressure monitoring system for a wheeled vehicle, said system comprising at least one tire pressure monitoring device according to the first aspect of the invention mounted, in use, on a wheel of said vehicle, the system further including a central controller in wireless communication with said at least one tire pressure monitoring device.

A third aspect of the invention provides a wheeled vehicle comprising the tire pressure monitoring device of the first aspect of the invention.

A fourth aspect of the invention provides a method of detecting vehicle motion from a tire pressure sensor, the method comprising:

determining from an output signal of said pressure sensor an indication of the power of said output signal; and detecting if said vehicle is stationary or in motion depending on said determined indication of power.

In some embodiments, shock sensors, accelerometers or other accelerometric devices can be omitted from the wheel mountable unit of the TPMS. This reduces not only the cost of the wheel unit but also testing costs. It also saves space.

Preferred embodiments provide a more robust solution to the problem of motion detection since there is no susceptibility to contaminants such as flux residue and moisture.

In cases where shock sensors or the like cannot be omitted, for example in a TPMS that performs wheel autolocation using shock sensors or the like, embodiments of the invention can be added to carry out a constant wake check. For example, if the shock sensor indicates motion and the pressure sensor motion check circuit indicates no motion, then it could be assumed that the vehicle is not moving, thus preventing a constant wake situation from occurring.

For wheel mountable TPMS devices that do not perform autolocation, the invention allows accelerometric devices (e.g. shock sensor or accelerometer) to be omitted, the output from the pressure sensor instead being used to determine if the vehicle is moving.

Further advantageous aspects of the invention will be apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which:

FIG. 3 is a graph illustrating exemplary output signals from a pressure sensor included in the tire pressure monitoring device of FIG. 1;

DETAILED DESCRIPTION OF THE DRAWINGS

Figure 1:
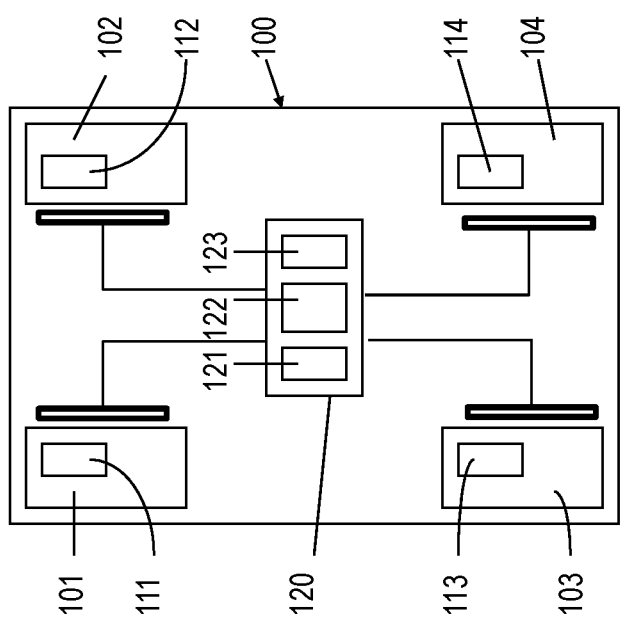
FIG. 1 is a block diagram of a vehicle including a tire pressure monitoring system.

FIG. 1 shows a system diagram of a wheeled vehicle 100, each wheel including a tire mounted on a rim. The arrangement and number of wheels can vary depending on the vehicle. In this example 4 wheels are shown 101, 102, 103 and 104. Each wheel is fitted with a tire pressure monitoring device, also known as a TPMS sensor or TPMS device, 111, 112, 113 and 114, being a wheel mountable component of a tire pressure monitoring system (TPMS). The TPMS device can be mounted to either the tire or rim of the respective wheel. The vehicle includes a control unit, for example electronic control unit (ECU) 120, which is configured to receive and process transmissions from the TPMS devices 111, 112, 113, 114 and as such forms part of the TPMS. The ECU 120 typically comprises at least a TPMS receiver 121, a controller 122, and a means of communicating with other vehicle electronics 123, such as a CAN or LIN bus. The TPMS receiver 121 receives signals, typically wirelessly, from the TPMS devices 111, 112, 113, 114 and the controller 122 is configured to process the signals to perform tire pressure monitoring, the nature of which may vary from system to system.

Figure 2:
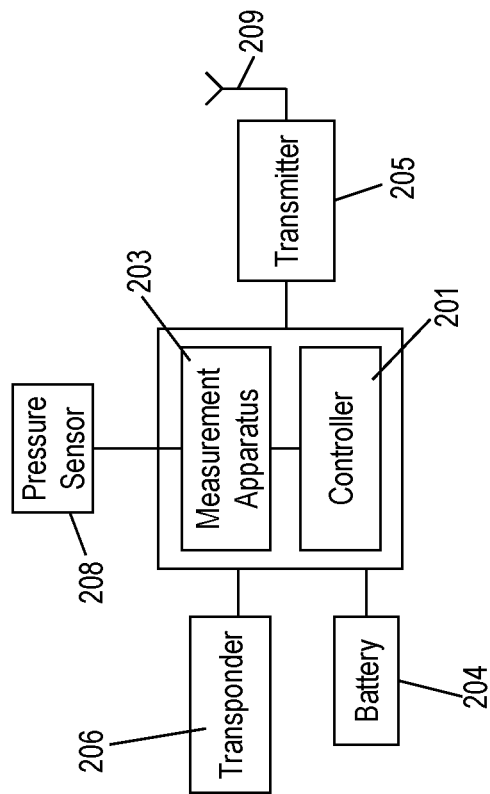
FIG. 2 is a block diagram of a tire pressure monitoring device embodying one aspect of the invention, the device being a wheel mountable component of the tire pressure monitoring system of FIG. 1.

FIG. 2 shows a block diagram of an embodiment of the TPMS device 111, 112, 113, 114. The TPMS device includes a central controller 201, which may comprise a suitably programmed processor, for example a dedicated microprocessor or a microcontroller, or other programmable processing device. Standard components such as a RAM memory, an ADC, an I/O interface, a clock oscillator and a central microprocessor (not shown) may be provided, the components typically being integrated onto a single chip. Alternatively, a custom microcontroller, for example an Application Specific Integrated Circuit (ASIC), designed from the ground up for the TPMS application may be used and may integrate ancillary components such as a temperature sensor.

The TPMS device is typically powered by a battery 204 although other micro power sources may be used, e.g. thermoelectric and/or piezoelectric generators and/or electromagnetic induction device, instead of or in addition to the battery. A transponder 206 may be provided to receive command signals (e.g. for programming the TPMS device), preferably at 125 kHz. Optionally, one or more other sensors, for example temperature sensor(s) or shock sensor(s) may be provided (not shown). Conventional interface circuitry (not shown) may be provided to enable such sensors to interface with the controller 201. Advantageously, the present invention allows motion detecting devices, such as shock sensors, an accelerometer or a roll switch, to be omitted from the TPMS device. However, in some cases such sensors may be provided for purposes other than motion detection. For example, one or more shock sensors may be provided to allow the TMPS to perform tire autolocation.

A pressure sensor 208, e.g. a piezoresistive transducer or a piezoelectric or capacitance based pressure sensor, is provided for measuring the fluid (typically air or other gas) pressure in the respective tire. In preferred embodiments, the pressure sensor 208 is a MEMS (microelectromechanical) pressure sensor.

The pressure sensor 208 is connected to a measurement apparatus 203 for measuring the tire pressure using signals received from the pressure sensor 208 and for providing corresponding measurement information to the controller 201. In typical embodiments, the measurement apparatus 203 includes electronic circuitry (not shown) for performing pressure measurements for the purpose of tire pressure monitoring. The configuration of such circuitry may be conventional and may vary, but typically includes at least one amplifier, optionally at least one filter and usually an analogue to digital converter (ADC) (not shown) for measuring pressure values. During routine pressure measurement, under control of the controller 201 the measurement apparatus 203 samples the output of the pressure sensor 208 at intervals and communicates corresponding measurement data to the controller 201.

In embodiments of the present invention, the measurement apparatus 203 is configured to monitor the output of the pressure sensor 208 for the purpose of motion detection, as is described in more detail below.

A transmitter 205 with antenna 209 are used to make transmissions to the vehicle ECU 120 preferably at 315 or 433 MHz.

In typical embodiments, the TPMS device 111, 112, 113, 114 may be similar to known TPMS devices and may share many features with those devices already well known to those skilled in the art. The fundamentals of the TPMS system may remain the same—a self-powered TPMS device attached in use to a vehicle wheel, in a manner that allows it to measure the pressure and optionally the temperature of the gas in the tire. Pressure measurements are usually taken periodically. In use the TPMS device transmits data representing the measured parameters to an external controller such as the vehicle ECU 120. A temperature sensor may also be provided. An oxygen sensor can be fitted to determine, if gas in the tire is air or atmospheric nitrogen In arriving at the present invention, it is recognised that relatively small variations in tire pressure are present when the vehicle is moving but not when the vehicle is stationary. For example, for a typical vehicle, vehicle motion creates fluctuations in tire pressure with occasional peaks of approximately +/−30 mpsi. Accordingly, there is an appreciable difference between the output of the pressure sensor when the vehicle is moving compared to when the vehicle is stationary. This is illustrated in FIG. 3, which shows a respective sampled output signal from the pressure sensor 208 when the vehicle is stationary (P_stat) and when the vehicle is moving (P_mov). It can be seen that when the vehicle is stationary the output signal P_stat has a magnitude of substantially zero (although some signal noise is typically present), whereas when the vehicle is moving the output signal P_mov includes signal component with a peak-to-peak magnitude of approximately 0.1 mV to 1 mV.

Such pressure variations may be caused by any one or more of a number of factors. For example, it is observed that rolling engagement of the tire with a ground surface may cause an acoustic resonance in the tire, typically at a frequency of between 200 Hz to 300 Hz. Other factors include the tire changing shape during rolling engagement with the ground surface, the relative roughness of the ground surface during rolling engagement with the tire, and forces resulting from the action of vehicle's shock absorbers being transmitted to the tire. The tire pressure variations cause one or more corresponding signal component to be present in the output signal of the pressure sensor 208, the signal components being present at predictable frequencies, or in predictable frequency bands.

Figure 4:
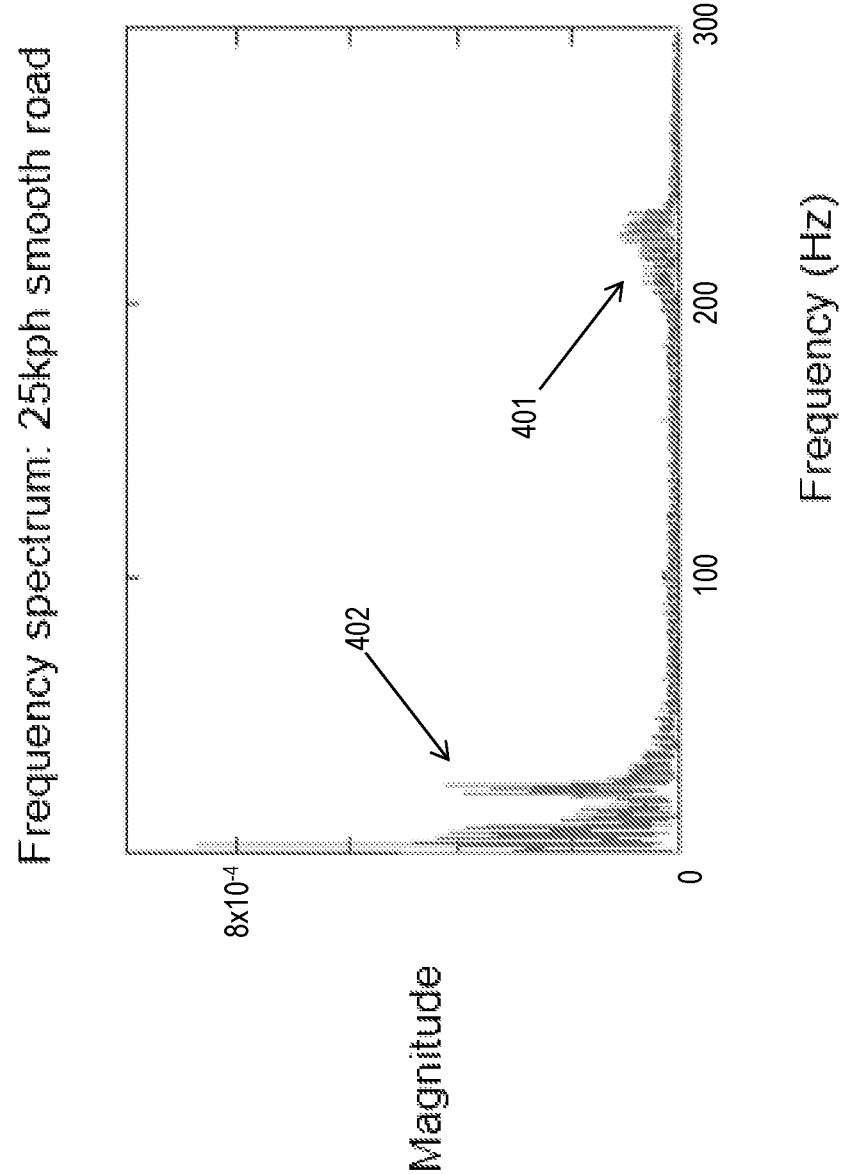
FIG. 4 is a graph illustrating an output signal from the pressure sensor in the frequency domain.

For example, with reference to FIG. 4, the output signal of the pressure sensor 208 may include a signal component 401 between approximately 200 Hz to 300 Hz corresponding to acoustic resonance caused by rolling engagement of the tire with the ground, and one or more other signal components 402 at frequencies up to approximately 100 Hz corresponding to other factors such as those described above. More generally, signal components caused by movement of the vehicle may present at frequencies up to approximately 500 Hz, but are most typically present between approximately 0-300 Hz.

Accordingly, by analysing the output of the pressure sensor and determining whether or not it includes one or more signal components associated with movement of the vehicle, a determination can be made as to whether or not the vehicle is moving.

Optionally, this may be achieved by detecting (directly) whether or not one or more relevant signal components, e.g. the signal component at 200 Hz to 300 Hz corresponding to acoustic resonance, are present in the pressure sensor output and, if so, to determine that the vehicle is moving. This may involve configuring the measurement apparatus 203 and/or the controller 201 to filter and/or perform frequency analysis of the pressure sensor output signal, for example using analogue and/or digital signal processing circuitry and/or signal processing software. Alternatively, the power of the pressure sensor output signal in one or more relevant frequency bands (e.g. up to 100 Hz, up to 300 Hz, up to 500 Hz and/or 200-300 Hz) may be measured and, if it exceeds a threshold value, a determination may be made that the vehicle is moving. However, signal processing that involves filtering and/or frequency analysis is relatively expensive and so a less complex approach is preferable.

To this end, it is observed that the power of the pressure sensor output signal that results from signal components associated with movement of the vehicle can be measured by measuring the power across the whole spectrum of pressure sensor output signal, i.e. not limited to any particular frequency band(s). This is because, when the vehicle is stationary, typically there is substantially no power in the output signal of the pressure sensor, although a small amount of power may be present as a result of signal noise. In any event, the power of the full signal (i.e. not just the power in certain frequency band(s)) is discernibly higher when the vehicle is moving compared to when it is not. Therefore, a determination as to whether or not the vehicle is moving can be made by determining whether or not the power of the pressure sensor output signal meets one or more motion detection threshold. In preferred embodiments, it may be determined that the vehicle is moving if the pressure sensor output signal power level exceeds a threshold value. Alternatively, or in addition, it may be determined that the vehicle is moving if the pressure sensor output signal power level increases by more than an threshold value. The, or each, threshold value may be determined empirically but in any event is set to prevent or minimize false detections arising from any power that may be present as a result of signal noise.

In preferred embodiments, therefore, the measurement apparatus 203 is configured to act as a power monitor and to this end includes means, typically comprising electrical and/or electronic circuitry, for monitoring the power of the pressure sensor output signal. The measurement apparatus 203 may be configured to measure the power, e.g. to determine a value for the total power, average power, RMS level or other power measurement of the signal. Preferably however, the measurement apparatus 203 is configured to monitor one or more characteristics of the pressure sensor output signal that are indicative of the signal power level. In preferred embodiments, the measurement apparatus 203 is configured to monitor, and more particularly to measure, the variance of the pressure sensor output signal, the variance being indicative of the power of the signal.

In any event, in preferred embodiments the measurement apparatus 203 produces an output signal that is indicative of the power of the pressure sensor output signal or which may be used to assess the power of the pressure sensor output signal. The output signal from the measurement apparatus 203 is sent to the controller 201 which analyses the signal to determine whether or not vehicle motion is detected. Hence the controller 201 acts as a motion detector. This may involve comparing the measured variance (or other measured indication of power) against the, or each, relevant threshold value, and determining that the vehicle is in motion if the relevant threshold value(s) is met. Alternatively or in addition this may involve comparing changes in the measured variance (or other measured indication of power) against the, or each, relevant threshold value, and determining that the vehicle is in motion if the relevant threshold value(s) is met.

Alternatively, the measurement apparatus 203 may be configured to compare the measured variance (or other measured indication of power) against the, or each, relevant threshold value, or to compare changes the measured variance (or other measured indication of power) against the, or each, relevant threshold value. This may be achieved by, for example, the provision of suitable comparator circuitry (not illustrated). Hence the measurement apparatus 203 may act as a motion detector. In such embodiments, the output signal provided by the measurement apparatus 203 to the controller 201 is indicative of whether or not motion is detected and the controller 201 is configured to interpret it accordingly.

It will be apparent to a skilled person that there are many ways to implement the measurement apparatus 203 using conventional electrical and/or electronic circuitry. A preferred implementation is now described with reference to FIG. 5.

Figure 5:
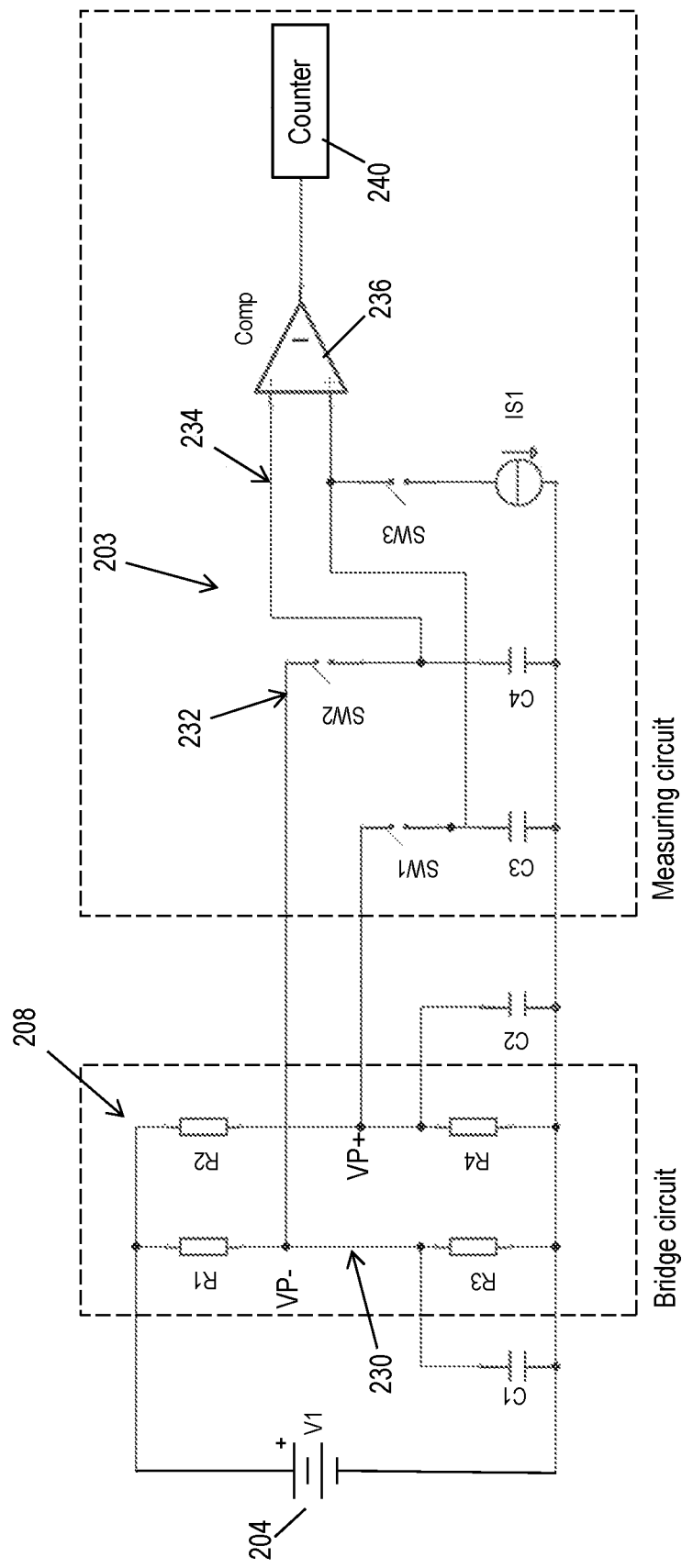
FIG. 5 is a circuit diagram of one example of a signal measuring apparatus suitable for use in embodiments of the invention, shown connected to a pressure sensor.

FIG. 5 shows an embodiment of the measuring apparatus 203 connected to an embodiment of the pressure sensor 208. Only those components of the measuring apparatus 203 that are used to monitor the power (or related characteristic) of the pressure sensor output for the purposes of motion detection are shown. In practice, the measurement apparatus 203 may include other circuitry for performing other measurements, e.g. routine pressure measurements. The pressure sensor 208 is assumed to be a resistive bridge sensor and comprises a resistive bridge circuit 230. The sensor 230 comprises resistive elements R1, R2, R3, R4 arranged in a bridge circuit, a Wheatstone bridge configuration in this example. The common node between resistors R1 and R2 is connected to the positive terminal of the battery 204, and the common node between resistors R3 and R4 is connected to the negative terminal of the battery 204. The common node VP− between resistors R1 and R3 and the common node VP+ between resistors R2 and R4 provide positive and negative output signals, respectively, of the sensor 208, i.e. the sensor 208 produces a differential output signal. At least one of the resistors R1, R2, R3, R4 has a resistance that varies with pressure, and to this end may for example comprise a piezoresistive element. In use, when the pressure sensor 208 is exposed to the fluid in the tire, the resistance of at least one leg of the bridge circuit varies with fluid pressure and so the sensor output signal at VP+, VP− varies accordingly. Preferably, capacitors C1 and C2 are provided to limit the bandwidth of the output signal. For example the capacitors may be selected to limit the bandwidth to, say, up to 500 Hz, or other upper limit that allows the desired signal components to be detected while filtering higher frequency noise. The capacitors C1, C2 are connected between a respective output node VP−, VP+ and the negative battery terminal.

The measurement apparatus 203 comprises a sampling circuit 232 that includes one or more storage device or means for storing the sampled signal values. In this embodiment the storage means comprises capacitors C3, C4 for storing, respectively, the sampled signal value from the negative and positive outputs VP+, VP− of the sensor 208. The sampling circuit 232 comprises switches SW1, SW2 that are operable to sample the negative and positive output signals at VP+, VP− respectively. The arrangement is such that, when the switches SW1, SW2 are closed, the respective output signal (voltage) level charges the respective capacitor C3, C4 thereby storing the respective sample value. The sampling rate may be selected as desired but is preferably in the range 10 to 50 samples per second.

The measurement apparatus 203 further includes a sample measuring circuit 234 for measuring a characteristic of the output signal that is indicative of signal power, or at least which may be used to calculate an indication of signal power. In this embodiment, the sample measuring circuit 234 measures the difference between the respective corresponding sample values taken from outputs VP+, VP− and, in this case, stored by capacitors C3, C4. Since the sensor output is a differential signal, the difference between the corresponding positive and negative sample values is indicative of the magnitude of the output signal which may be used to assess the variance of the signal and therefore signal power.

To this end, the sample measuring circuit 234 includes a comparator 236, the respective corresponding sample values being provided to respective inputs of the comparator 236. In the present example, the capacitors C3, C4 are connected to a respective input (the positive and negative input respectively) of the comparator 236 for this purpose. The circuit 234 further includes means for discharging one of the sample values (in this case the positive sample value) to the respective comparator input, while the other sample value is present at the other comparator input. In this example, the discharging means comprises a current source IS1 connected in parallel with the capacitor C3 that stores the sample to be discharged. The current source IS1 is selectively switched in-circuit or out-of-circuit by switch SW3. The output of the comparator 236 indicates when the sample values at its inputs are equal. Because the discharge of the positive sample value to the capacitor input is linear, the length of time taken until the discharged sample value matches the sample value at the other comparator input is indicative of the difference between the corresponding positive and negative sample values. The output of the comparator 236 may be monitored by a counter 240 that is operated each time the pressure sensor output signal is sampled to count the length of time taken for the comparator 236 to indicate that its input values match. Hence, the count value for each sample is indicative of the difference between the respective sample values and can therefore be used to assess signal power/variance. The counter 240 may be part of the sample measuring circuit 234 or provided elsewhere, e.g. as part of the controller 201, as is convenient.

In use, the switches SW1 and SW2 are operated to sample the output of the pressure sensor 208 at VP+ and VP−. During the sampling process, the switches SW1, SW2 are momentarily closed and then opened again. The sampled values from VP+ and VP− are stored on capacitors C3 and C4 respectively. The current source IS1 is turned on and off by the switch SW3. During sampling, switch SW3 is typically open so that current source IS1 is off. After the outputs VP+, VP− have been sampled (i.e. when switches SW1, SW2 are open), the current source IS1 is switched on (SW3 closed) and the positive sample value (that is stored on C3) is discharged linearly to the comparator input until it reaches the same value that is stored on C4 (the negative side of the bridge). The time at which the two are equal is detected by the comparator 236. During the discharge process the counter 240 counts (the direction of counting does not matter) the time that it takes for the positive side of the bridge to discharge to the same level as the negative side. When the comparator input values are equal, which is indicated by the comparator output, the counter 240 is switched off and the count value recorded against the respective sample. Since the discharge is linear, the count that is stored in the counter is proportional to the difference in voltage between the positive and negative sides of the bridge.

Typically, operation of the measurement apparatus 203, including operation of the switches SW1, SW2, SW3 and the counter 240, is controlled by a controller (not shown) that is part of the apparatus 203. The measurement apparatus 203 may be activated by the controller 201 when required.

By way of example, sampling of the pressure sensor output signal may be performed over an assessment period of typically 0.5 to 5 seconds duration (preferably approximately 1 second), and be repeated periodically, for example every 10 seconds (or other period preferably between 5 and 60 seconds). During each assessment period, the output signal is sampled multiple times, typically at a sampling rate corresponding to between 5 to 50 times per second, and a respective count value is calculated for each sample. It will be understood that the assessment period and repeat period may be longer or shorter than stated, and that the sampling rate may be higher or lower as suits the application.

The respective count value for each sample may be stored in any convenient manner, for example in a memory (not shown) or any other storage device included in or accessible to the controller 201. The count values may be processed in any desired way to assess (directly or indirectly) the power of the pressure sensor output signal. Conveniently, such processing is performed by the controller 201. For example, the count value for each sample may be provided by the measurement apparatus 203 to the controller 201 for storage and processing. By way of example, processing the count values may involve averaging count values calculated in respect of a predetermined number of samples, and comparing the averaged value against a threshold. If the averaged value is higher than the threshold then it may be concluded that the vehicle is moving. The threshold is set to prevent counts that could be generated just by signal noise from causing a false detection of motion. The threshold value may be determined empirically. It is noted that the count values can be affected by the underlying pressure of the tire, e.g. the general inflation level of the tire. Therefore the controller 201 or the measurement apparatus 203, as is convenient, may be arranged to adjust the threshold value depending on the measured tire pressure, e.g. to increase the threshold for higher tire pressures and decrease it for lower pressures.

In the embodiment of FIG. 5, the respective count value for multiple samples are used to assess the variance of the pressure sensor output signal, the variance being indicative of the signal's power. The count value is indicative of the magnitude of the respective sample of the pressure sensor output signal, the magnitude being a characteristic of the signal that can be used to measure variance and therefore obtain an indication of power. In preferred embodiments, therefore, it may be said that the measurement apparatus 203, samples the pressure sensor output signal and provides to the controller 201 in respect of each sample, a value for a characteristic of the signal that can be used to assess the power of the signal. The characteristic may be a magnitude of the signal sample. In the present example, the characteristic is the difference between positive and negative sample values taken from a differential output signal of the pressure sensor.

In preferred embodiments, the characteristic values measured by the measurement apparatus 203 are provided to the controller 201 for analysis and use in motion detection. The analysis typically involves using the characteristic values of multiple samples taken over a given assessment period to measure the variance of the pressure sensor output signal, or otherwise to assess the power of the signal. As indicated above, this may involve averaging the characteristic values and comparing the average value to a threshold value.

In alternative embodiments, some or all of the analysis of the characteristic values may be performed by the measurement apparatus 203. For example, the measurement apparatus may include circuitry for performing any one or more of the following tasks: storing count values or other characteristic values; averaging the values for a given assessment period; and/or comparing the averaged value to a threshold value. It is possible therefore that in alternative embodiments, the output provided by the measurement apparatus to the controller is an indication of signal power, or even an indication as to whether or not motion is detected. It will be understood therefore that, in alternative embodiments, the various task described herein for detecting motion from the pressure sensor output signal may be performed by the measurement apparatus or the controller as is convenient.

The invention is not limited to the embodiment(s) described herein but can be amended or modified without departing from the scope of the present invention.

The invention claimed is:

1. A tire pressure monitoring device for a wheeled vehicle, the device comprising:
    a pressure sensor that provides an output signal indicative of a fluid pressure in a tire of said vehicle;
    a power monitor coupled with said pressure sensor that provides, based at least in part on said output signal, a determined indication of power of said output signal;
    a motion detector coupled with said power monitor that detects, based at least in part on said determined indication of power of said output signal, if said vehicle is stationary or in motion; and
    a transmitter coupled with the motion detector that transmits, based at least in part on an output of the motion detector, an indication of said fluid pressure to a receiver that is external to the tire pressure monitoring device.

2. The tire pressure monitoring device of claim 1, wherein said motion detector is configured to determine that said vehicle is in motion if said determined indication of power exceeds a threshold value.

3. The tire pressure monitoring device of claim 1, wherein said motion detector is configured to determine if said vehicle is in motion if said determined indication of power indicates that said power has changed by more than a threshold amount.

4. The tire pressure monitoring device of claim 1, wherein said determined indication of power comprises a measure of the variance of the output signal.

5. The tire pressure monitoring device of claim 1, wherein said power monitor is configured to determine said indication of power in respect of the entire frequency spectrum of said output signal.

6. The tire pressure monitoring device of claim 1, wherein said power monitor is configured to determine said indication of power in respect of at least one frequency band corresponding to part of the frequency spectrum of said output signal, and wherein, said at least one frequency band comprises any one or more of the following frequency bands: 0 to 500 Hz; 0 to 300 Hz; 0 to 100 Hz; 200-300 Hz.

7. The tire pressure monitoring device of claim 1 wherein said power monitor includes a measuring apparatus for measuring a characteristic of said output signal from which said power indication is calculated, said characteristic being a magnitude of said output signal.

8. The tire pressure monitoring device of claim 7, wherein said output signal comprises first and second complementary differential signals, said characteristic being the difference between said first and second complementary differential signals.

9. The tire pressure monitoring device of claim 7, wherein said measuring apparatus is configured to sample said output signal and to measure said characteristic in respect of each signal sample, and wherein said power monitor is configured to determine said power indication from the respective measured characteristic of a plurality of said signal samples.

10. The tire pressure monitoring device of claim 9, wherein said plurality of signal samples are taken in respect of an assessment period, said power monitor being configured to determine said power indication for said assessment period, and wherein said tire pressure monitoring device is configured to implement multiple instances of said assessment period.

11. The tire pressure monitoring device of claim 10, wherein said motion detector is configured to determine if said vehicle is in motion in respect of the, or each, assessment period.

12. The tire pressure monitoring device of claim 7, wherein said measurement apparatus comprises circuitry for measuring said output signal, said measurement apparatus including a sampling circuit for sampling said pressure sensor output signal, and wherein the pressure sensor is configured to produce an output signal comprising first and second complementary differential signals, said sampling circuit being configured to sample both of said differential signals.

13. The tire pressure monitoring device of claim 12, wherein said measurement apparatus includes a measuring circuit for measuring said characteristic in respect of each sample from a respective corresponding sample value for each of said differential signals.

14. The tire pressure monitoring device of claim 12, wherein said measurement apparatus includes one or more storage device for storing the or each signal sample value obtained by said sampling circuit.

15. The tire pressure monitoring device of claim 14, wherein said one or more storage device comprises at least one respective capacitor for the or each signal sample value.

16. The tire pressure monitoring device of claim 12, wherein the pressure sensor is configured to produce an output signal comprising first and second complementary differential signals, and wherein said measurement apparatus includes: a sampling circuit for sampling both of said differential signals of said pressure sensor output signal; one or more storage device for storing the respective sample values; and a measuring circuit for measuring said characteristic in respect of each sample from the respective corresponding sample value for each of said differential signals.

17. The tire pressure monitoring device of claim 16, wherein said measuring circuit is configured to measure the difference between the respective corresponding sample value for each of said differential signals.

18. The tire pressure monitoring device of claim 17, wherein said respective corresponding sample value for each of said differential signals are stored by a respective storage device and said measuring circuitry is configured to discharge one of the sample values from the respective storage device, said measuring circuitry including or being co-operable with, a counter for determining a time taken for said discharged sample value to match said other sample value, and wherein said time preferably provides a measure of said characteristic, and wherein said respective storage device comprises at least one respective capacitor.

19. The tire pressure monitoring device of claim 18, wherein said one sample value is discharged, in use, to a first comparator input, while the other sample value is present at a second comparator input, the comparator providing an output indicating when the discharged sample value matches the other sample value.

20. The tire pressure monitoring device as claimed in claim 12, including a controller, said controller being configured to implement said power monitor other than said measuring apparatus.

21. The tire pressure monitoring device as claimed in claim 1, further including a controller, said controller being configured to implement said motion detector.

22. A method of detecting vehicle motion from a tire pressure sensor within a tire of said vehicle, the method comprising:
    determining from an output signal of said pressure sensor an indication of the power of said output signal, wherein said output signal indicates a fluid pressure in said tire of said vehicle;
    detecting if said vehicle is stationary or in motion depending on said determined indication of power; and
    transmitting, based at least in part on the detecting, an indication of said fluid pressure to a receiver that is external to said tire of said vehicle.

* * * * *